United States Patent
Kuo et al.

(10) Patent No.: US 12,464,958 B2
(45) Date of Patent: Nov. 4, 2025

(54) MAGNETORESISTIVE RANDOM ACCESS MEMORY (MRAM) DEVICE AND METHOD OF FORMING THE SAME

(71) Applicant: United Microelectronics Corp., Hsinchu (TW)

(72) Inventors: Chih-Wei Kuo, Tainan (TW); Hung-Chan Lin, Tainan (TW); Chung Yi Chiu, Tainan (TW)

(73) Assignee: United Microelectronics Corp., Hsinchu (TW)

( * ) Notice: Subject to any disclaimer, the term of this patent is extended or adjusted under 35 U.S.C. 154(b) by 502 days.

(21) Appl. No.: 17/892,162

(22) Filed: Aug. 22, 2022

(65) Prior Publication Data
US 2024/0032441 A1    Jan. 25, 2024

(30) Foreign Application Priority Data
Jul. 19, 2022 (TW) .................................. 111127043

(51) Int. Cl.
| | |
|---|---|
| *H10N 52/80* | (2023.01) |
| *H10B 61/00* | (2023.01) |
| *H10N 50/85* | (2023.01) |
| *H10N 52/00* | (2023.01) |
| *H10N 52/01* | (2023.01) |

(52) U.S. Cl.
CPC ............. *H10N 52/80* (2023.02); *H10B 61/00* (2023.02); *H10N 50/85* (2023.02); *H10N 52/00* (2023.02); *H10N 52/01* (2023.02)

(58) Field of Classification Search
CPC ........ H10N 50/01; H10N 50/10; H10N 50/20; H10N 50/80; H10N 52/01; H10N 59/00; H10N 50/85; H10N 52/00; H10N 52/80; G11C 11/16; G11C 11/18; G11C 11/161; H10B 61/10; H10B 61/00
See application file for complete search history.

(56) References Cited

U.S. PATENT DOCUMENTS

| | | | |
|---|---|---|---|
| 2020/0006643 A1* | 1/2020 | Gosavi .................. | H10N 50/10 |
| 2023/0084241 A1* | 3/2023 | Lin ........................ | H10N 52/00 |
| | | | 257/421 |
| 2023/0097481 A1* | 3/2023 | Lin ........................ | H10N 52/01 |
| | | | 257/427 |

(Continued)

FOREIGN PATENT DOCUMENTS

TW    202109871    3/2021

OTHER PUBLICATIONS

"Office Action of Taiwan Counterpart Application", issued on Aug. 28, 2025, p. 1-p. 3.

*Primary Examiner* — Latanya N Crawford Eason
(74) *Attorney, Agent, or Firm* — JCIPRNET (57) ABSTRACT

Provided is a magnetoresistive random access memory (MRAM) device including a bottom electrode, a magnetic tunnel junction (MTJ) structure, a first spin orbit torque (SOT) layer, a cap layer, a second SOT layer, an etch stop layer, and an upper metal line layer. The MTJ structure is disposed on the bottom electrode. The first SOT layer is disposed on the MTJ structure. The cap layer is disposed on the first SOT layer. The second SOT layer is disposed on the cap layer. The etch stop layer is disposed on the second SOT layer. The upper metal line layer penetrates though the etch stop layer and is landed on the second SOT layer.

18 Claims, 7 Drawing Sheets

(56) References Cited

U.S. PATENT DOCUMENTS

| | | | | |
|---|---|---|---|---|
| 2023/0154514 A1* | 5/2023 | Lin | ............... | G11C 11/161 |
| | | | | 257/421 |
| 2023/0282260 A1* | 9/2023 | Chen | ............... | H01F 41/308 |
| | | | | 365/158 |
| 2023/0337551 A1* | 10/2023 | Wu | ............... | H10N 50/01 |
| 2024/0016063 A1* | 1/2024 | Kuo | ............... | H10B 61/00 |
| 2024/0016066 A1* | 1/2024 | Lu | ............... | H10N 52/01 |

* cited by examiner

MAGNETORESISTIVE RANDOM ACCESS MEMORY (MRAM) DEVICE AND METHOD OF FORMING THE SAME

CROSS-REFERENCE TO RELATED APPLICATION

This application claims the priority benefit of Taiwan application serial no. 111127043, filed on Jul. 19, 2022. The entirety of the above-mentioned patent application is hereby incorporated by reference herein and made a part of this specification.

BACKGROUND OF THE INVENTION

Field of the Invention

The disclosure relates to a semiconductor device and a method of forming the same, and in particular, to a magnetoresistive random access memory (MRAM) device and a method of forming the same.

Description of Related Art

Many modern electronic devices have memory devices. The memory device may be either volatile memory or non-volatile memory. Non-volatile memory retains stored data even when the power is turn off, while volatile memory loses its stored data when power is turn off. Magnetoresistive random access memory (MRAM) is expected to have great potential in the next generation of non-volatile memory technology due to its advantages over today's memory devices.

Magnetoresistive random access memory does not use traditional electric charge to store bit information, but uses magnetoresistance effect to store data. However, the conventional magnetoresistive random access memory process still has many shortcomings and needs to be further improved.

SUMMARY OF THE INVENTION

The present invention provides a magnetoresistive random access memory (MRAM) device, in which the upper metal line is directly landed on the second SOT layer to increase the contact area between the upper metal line and the second SOT layer, thereby increasing the driving current. In addition, the structure of the upper metal line directly landed on the second SOT layer can also effectively shorten the electrical path between the second SOT layer and the transistors in the front-end-of-line (FEOL) structure, so as to reduce the interconnection resistance, thereby improving the device performance.

The present invention provides a method of forming a magnetoresistive random access memory (MRAM) device, in which the etch stop layer is formed on the second SOT layer to prevent from damaging the second SOT layer due to the formation of trenches or vias in the subsequent back-end-of-line (BEOL) process, thereby improving the process yield and the device reliability.

The present invention provides a magnetoresistive random access memory (MRAM) device including a bottom electrode, a magnetic tunnel junction (MTJ) structure, a first spin orbit torque (SOT) layer, a cap layer, a second SOT layer, an etch stop layer, and an upper metal line layer. The MTJ structure is disposed on the bottom electrode. The first SOT layer is disposed on the MTJ structure. The cap layer is disposed on the first SOT layer. The second SOT layer is disposed on the cap layer. The etch stop layer is disposed on the second SOT layer. The upper metal line layer penetrates though the etch stop layer and is landed on the second SOT layer.

In an embodiment of the present invention, a material of the etch stop layer includes SiN, and a thickness of the etch stop layer is between 100 Å and 500 Å.

In an embodiment of the present invention, a material of the cap layer includes Ta, TaN, Pt, WN, or a combination thereof.

In an embodiment of the present invention, a material of the first SOT layer includes W, and a material of the second SOT layer includes TiN.

In an embodiment of the present invention, the MRAM device further includes: a protective layer covering a sidewall of the MTJ structure, a sidewall of the first SOT layer, and a sidewall of the cap layer; and an interlayer dielectric (ILD) layer disposed on the protective layer and laterally surrounding the MTJ structure, the first SOT layer, the cap layer, the second SOT layer, the etch stop layer, and the upper metal line layer.

In an embodiment of the present invention, the MRAM device further includes: a first lower metal line layer disposed directly under the bottom electrode, wherein the bottom electrode is electrically connected to a first transistor through the first lower metal line layer; and a second lower metal line layer disposed aside the first lower metal line layer, wherein the upper metal line layer is electrically connected to the second lower metal line layer through a conductive via penetrating through the ILD layer and the protective layer, and the second lower metal line layer is electrically connected to a second transistor different from the first transistor.

In an embodiment of the present invention, a material of the protective layer includes SiN.

In an embodiment of the present invention, an area of the second SOT layer is greater than an area of the first SOT layer.

The present invention provides a method of forming a magnetoresistive random access memory (MRAM) device including: forming a bottom electrode in a first dielectric layer; forming a memory stack structure on the bottom electrode; forming a protective layer to conformally cover a top surface and a sidewall of the memory stack structure; forming a second dielectric layer on the protective layer; performing a planarization process to expose the top surface of the memory stack structure; sequentially forming a SOT material layer and an etch stop material layer on the second dielectric layer and the top surface of the memory stack structure; patterning the etch stop material layer and the SOT material layer to form a second SOT layer and an etch stop layer corresponding to the memory stack structure; forming a third dielectric layer on the etch stop layer and the second dielectric layer; and forming an upper metal line layer in the third dielectric layer, wherein the upper metal line layer penetrates through the etch stop layer and stops on the second SOT layer.

In an embodiment of the present invention, the memory stack structure includes, from bottom to top, an MTJ structure, a first SOT layer, and a cap layer.

In an embodiment of the present invention, the first SOT layer and the second SOT layer have different materials, a material of the first SOT layer includes W, and a material of the second SOT layer includes TiN.

In an embodiment of the present invention, a material of the etch stop layer includes SiN, and a thickness of the etch stop layer is between 100 Å and 500 Å.

In an embodiment of the present invention, after forming the second dielectric layer, a topmost surface of the second dielectric layer on the memory stack structure is higher than a topmost surface of the second dielectric layer aside the memory stack structure.

In an embodiment of the present invention, after performing the planarization process, the top surface of the memory stack structure is substantially level with a top surface of the second dielectric layer.

In an embodiment of the present invention, after the patterning of the etch stop material layer and the SOT material layer, the second SOT layer and the etch stop layer are located directly above the memory stack structure, and a portion of the second dielectric layer is removed so that a top surface of the second dielectric layer is lower than a bottom surface of the second SOT layer.

In an embodiment of the present invention, after the patterning of the etch stop material layer and the SOT material layer, the second SOT layer further extends to cover a top surface of the second dielectric layer.

In an embodiment of the present invention, the forming the upper metal line layer includes: forming a hard mask layer on the third dielectric layer, wherein the hard mask layer has an opening partially overlapped with the second SOT layer; removing a portion of the third dielectric layer by using the hard mask layer as a mask to form a trench in the third dielectric layer, wherein the trench stops on the etch stop layer; performing an over-etching process to remove a portion of the etch stop layer so that the trench extends downward and stops on the second SOT layer; and filling the trenches with a metal material.

In an embodiment of the present invention, after the forming the trench, the method further includes forming a via hole, wherein the via hole extends from the bottom surface of the trench through the second dielectric layer, the protective layer, and the first dielectric layer to reach a lower metal line layer.

In an embodiment of the present invention, before the forming the trench, the method further includes forming a via hole in the first dielectric layer and the second dielectric layer beside the memory stack structure, wherein the trench is formed on the via hole to spatially communicate with the via hole.

In an embodiment of the present invention, the metal material is simultaneously filled into the trench and the via hole to form the upper metal line layer and a conductive via.

To provide a further understanding of the aforementioned and other features and advantages of the disclosure, exemplary embodiments, together with the reference drawings, are described in detail below.

DESCRIPTION OF THE EMBODIMENTS

The invention will be described in detail with reference to the drawings of the embodiments. However, the invention may also be implemented in various different forms and shall not be limited to the embodiments described herein. Thicknesses of layers and regions in the drawings are exaggerated for clarity. The same or similar numerals represent the same or similar components, which will not be repeatedly described in subsequent paragraphs.

FIG. 1 to FIG. 7 are schematic cross-sectional views illustrating a manufacturing process of a MRAM device according to an embodiment of the present invention.

Figure 1:
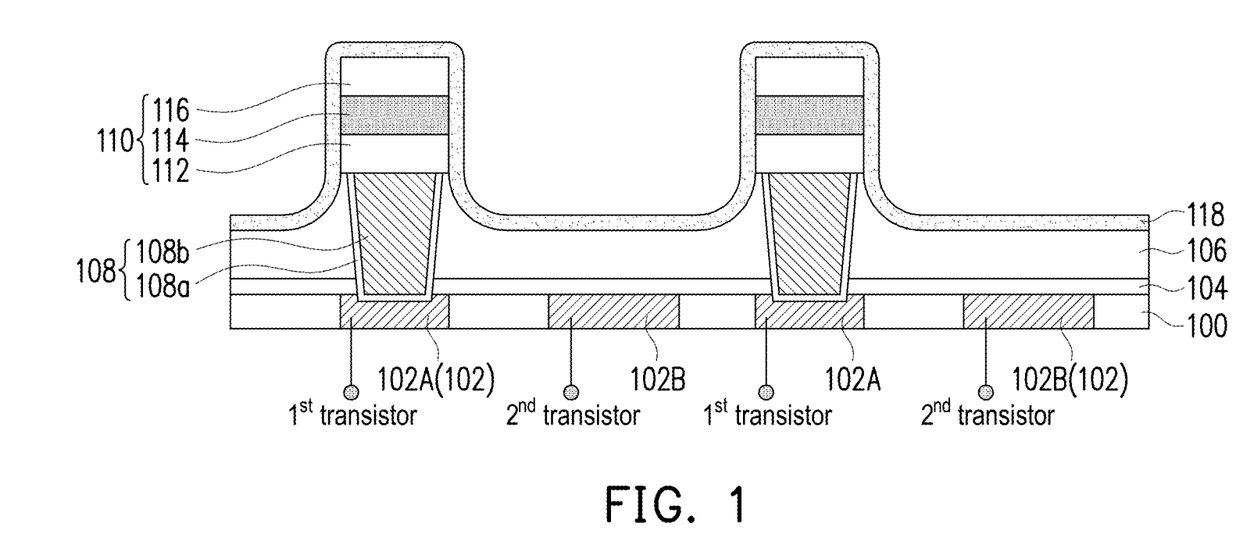
FIG. 1 to FIG. 7 are schematic cross-sectional views illustrating a manufacturing process of a MRAM device according to an embodiment of the present invention.
Figure 7:
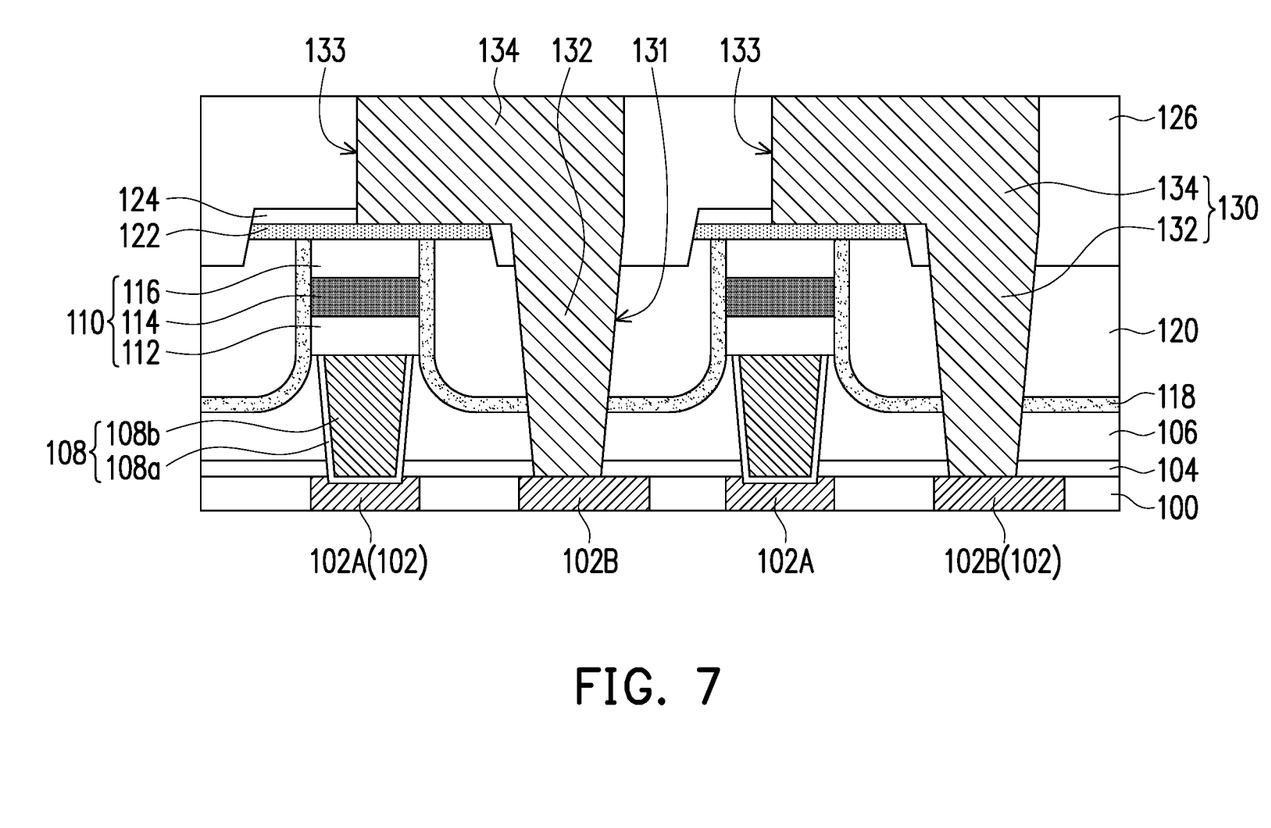

Referring to FIG. 1, an initial structure is provided. The initial structure includes: a lower dielectric layer 100, a lower metal line layer 102, a cap layer 104, a first dielectric layer 106, a bottom electrode 108, a memory stack structure 110, and a protective layer 118. Specifically, the lower metal line layer 102 may be embedded in the lower dielectric layer 100. The lower metal line layer 102 may include a first lower metal line layer 102A and a second lower metal line layer 102B. In one embodiment, the first lower metal line layer 102A corresponds to the overlying bottom electrode 108 and the memory stack structure 110, and is configured to electrically connect the bottom electrode 108 to a first transistor (not shown) in the FEOL structure. In one embodiment, the second lower metal line layer 102B is disposed aside the first lower metal line layer 102A, and is configured to electrically connect the subsequently formed upper metal line layer 134 (as shown in FIG. 7) to a second transistor (not shown) different from the said first transistor in the FEOL structure. In one embodiment, a material of the lower dielectric layer 100 is, for example, silicon oxide or a low-k dielectric material (i.e., a dielectric material with a dielectric constant value of less than 3.9), and a material of the lower metal line layer 102 includes a metal material such as copper, aluminum, tungsten, aluminum-copper, or the like. In addition, the lower metal line layer 102 further includes a barrier layer (not shown) disposed between the metal material and the lower dielectric layer 100, and a material of the barrier layer may include titanium (Ti), titanium nitride (TiN), tantalum (Ta), tantalum nitride (TaN), or a combination thereof.

The cap layer 104 may cover the lower dielectric layer 100 and the lower metal line layer 102. In one embodiment, a material of the cap layer 104 includes silicon nitride (SiN), silicon carbide (SiC), silicon carbide nitride (SiCN), silicon oxynitride (SiON), or a combination thereof.

The first dielectric layer 106 may be disposed on the cap layer 104. In one embodiment, a material of the first dielectric layer 106 is, for example, silicon oxide or a low-k dielectric material. The bottom electrode 108 may be disposed in the first dielectric layer 106, and penetrate through the cap layer 104 to contact the first lower metal line layer 102A. The bottom electrode 108 may include a barrier layer 108a and a conductive layer 108b. In one embodiment, a material of the barrier layer 108a includes Ti, TiN, Ta, TaN, or a combination thereof, and the conductive layer 108b includes a metal material such as copper, aluminum, tungsten, aluminum-copper, or the like.

The memory stack structure 110 may be disposed on the bottom electrode 108 and in contact with the bottom electrode 108. In detail, the memory stack structure 110 includes, from bottom to top, a magnetic tunnel junction (MTJ) structure 112, a first spin orbit torque (SOT) layer 114, and a cap layer 116. Although the MTJ structure 112 illustrated in FIG. 1 is a single-layered structure, the present invention is not limited thereto. In some embodiments, the MTJ structure 112 at least includes a three-layered structure composed of a lower ferromagnetic layer, a barrier layer, and an upper ferromagnetic layer. The barrier layer separates the upper ferromagnetic layer from the lower ferromagnetic layer. A material of the upper ferromagnetic layer and the lower ferromagnetic layer may include cobalt (Co), iron (Fe), boron (B), or a combination thereof, and a material of the barrier layer may include magnesium oxide, aluminum oxide, or a combination thereof. In some embodiments, the lower ferromagnetic layer may have a fixed or pinned magnetic orientation, while the upper ferromagnetic layer may have variable or free magnetic orientation which may switch between two or more different magnetic polarities. The said different magnetic polarities may represent different data states, respectively. In such embodiment, the lower ferromagnetic layer may be regarded as a pinned reference layer, and the upper ferromagnetic layer may be regarded as a free layer. In alternative embodiments, the MTJ structure 112 may be flipped vertically, i.e., the lower ferromagnetic layer may have a free magnetic orientation, while the upper ferromagnetic layer may have a pinned magnetic orientation. Although the MTJ structure 112 is described as the above-mentioned embodiment, the present invention is not limited to this, and those skilled in the art may adjust the composition of the MTJ structure 112 according to product requirements.

The first SOT layer 114 may be sandwiched between the MTJ structure 112 and the cap layer 116. In one embodiment, a material of the first SOT layer 114 includes a heavy metal material, such as platinum, palladium, tungsten, tantalum, gold, alloys of the foregoing materials, or a combination thereof. In the present embodiment, the material of the first SOT layer 114 is tungsten (W). In one embodiment, a material of the cap layer 116 includes Ta, TaN, Pt, WN, or a combination thereof. In the present embodiment, the cap layer 116 can be regarded as a top electrode or an etch stop layer to prevent from damaging the underlying first SOT layer 114 in the subsequent process.

In addition, the method of manufacturing the memory stack structure 110 may include the following steps, but the present invention is not limited thereto. First, the cap layer 104 and the first dielectric layer 106 may be sequentially formed on the lower dielectric layer 100 and the lower metal line layer 102. Next, the bottom electrode 108 may be formed in the cap layer 104 and the first dielectric layer 106 by a single damascene process. Afterward, a MTJ material layer, a SOT material layer, and a cap material layer (not shown) may be sequentially formed on the first dielectric layer 106 and the bottom electrode 108 through a deposition process, and then the MTJ material layer, the SOT material layer, and the cap material layer are patterned to form the MTJ structure 112, the first SOT layer 114 and the cap layer 116 by a photolithography process and an etching process.

After the memory stack structure 110 is formed, a protective layer 118 may be formed to conformally cover a top surface and a sidewall of the memory stack structure 110. In detail, the protective layer 118 extends from the surface of the memory stack structure 110 to cover a top surface of the first dielectric layer 106. In one embodiment, a material of the protective layer 118 is, for example, silicon nitride, and the protective layer 118 may be formed by a chemical vapor deposition (CVD) method, for example.

Figure 2:
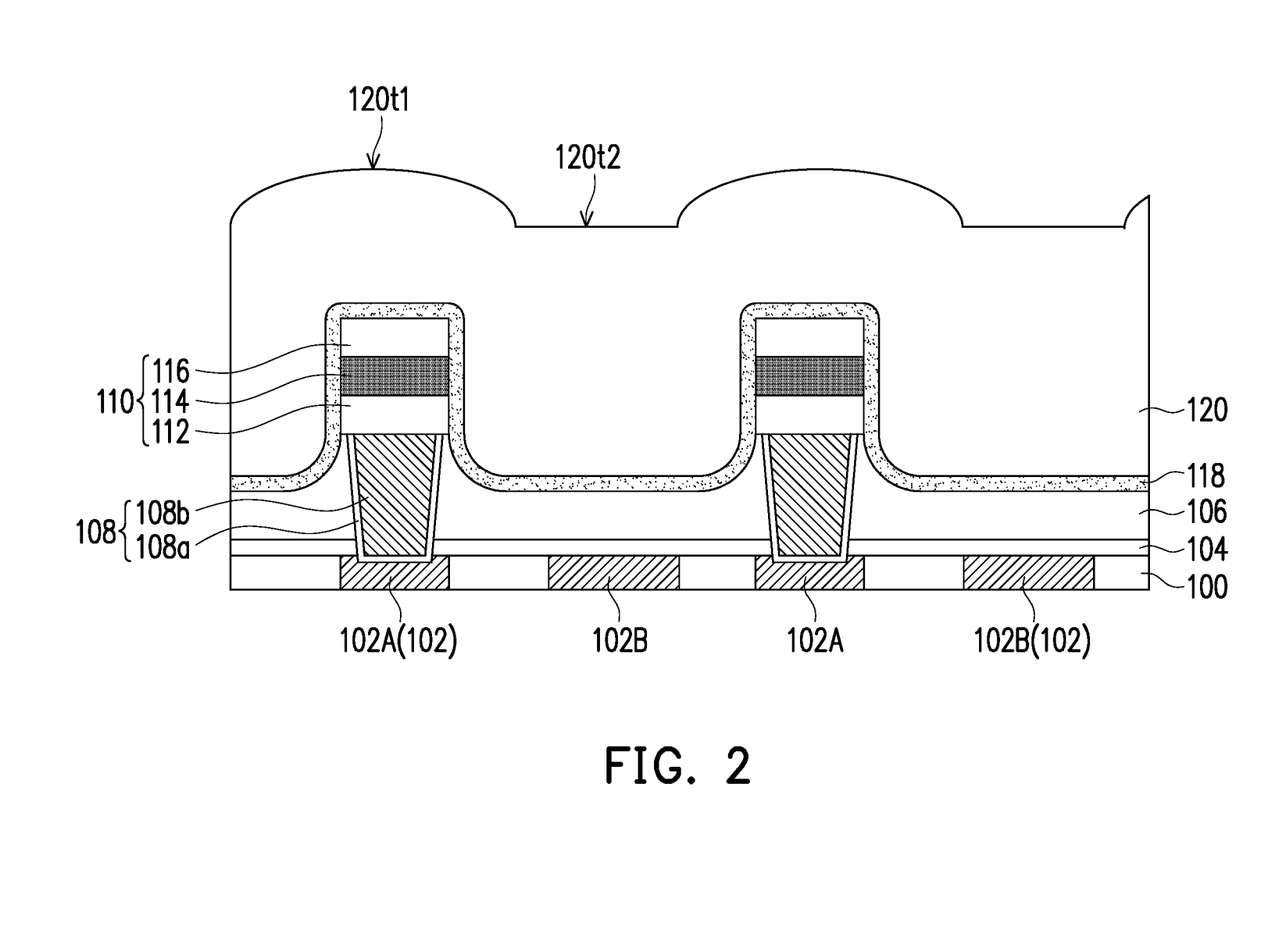

Referring to FIG. 2, a second dielectric layer 120 is formed on the protective layer 118. In one embodiment, a material of the second dielectric layer 120 is, for example, silicon oxide or a low-k dielectric material, and the second dielectric layer 120 may be formed by an atomic layer deposition (ALD) method, for example. After the second dielectric layer 120 is formed, a topmost surface 120t1 of the second dielectric layer 120 on the memory stack structure 110 is higher than a topmost surface 120t2 of the second dielectric layer 120 aside the memory stack structure 110. That is, the second dielectric layer 120 has an uneven top surface.

Figure 3:
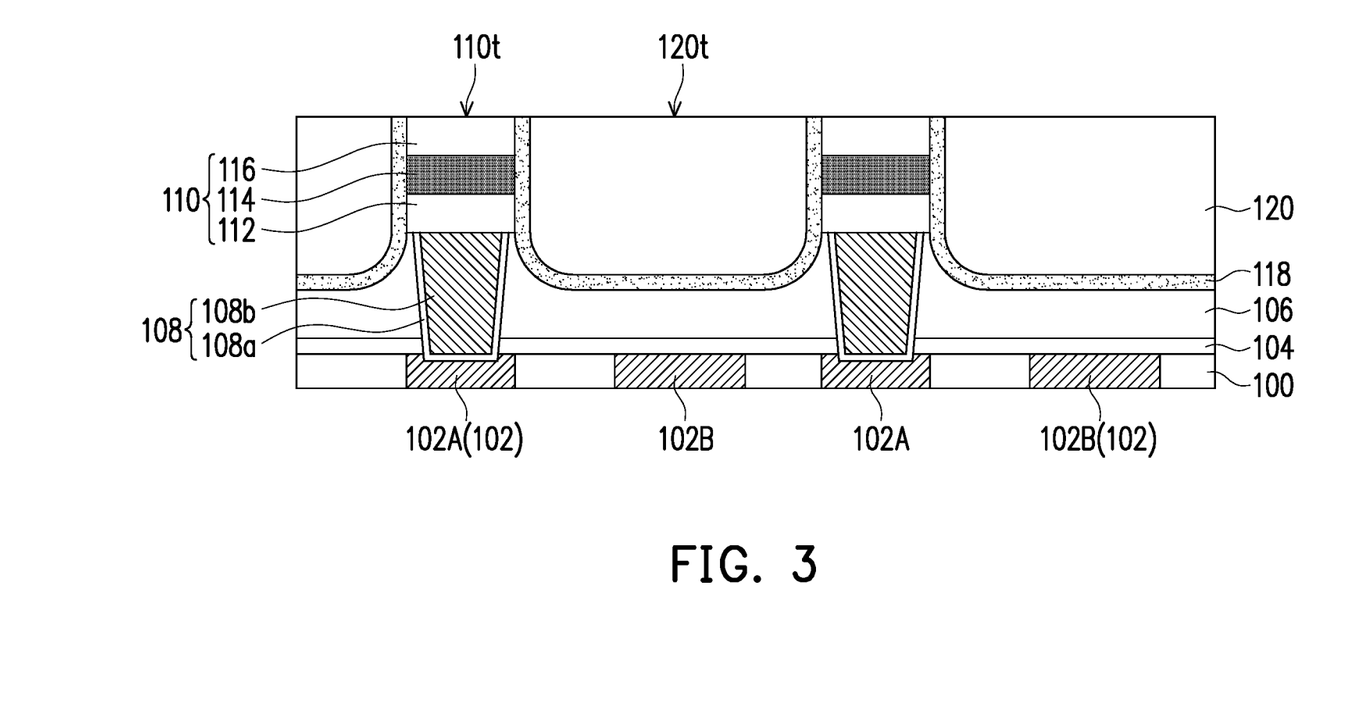

Referring to FIG. 3, a planarization process is performed to expose a top surface 110t of the memory stack structure 110. Specifically, the planarization process includes removing a portion of the second dielectric layer 120 and a portion of the protective layer 118 to expose the cap layer 116. In one embodiment, the planarization process is, for example, a chemical mechanical polishing (CMP) process. In addition, after the planarization process, the top surface 110t of the memory stack structure 110 is substantially level with the top surface 120t of the second dielectric layer 120.

Figure 4:
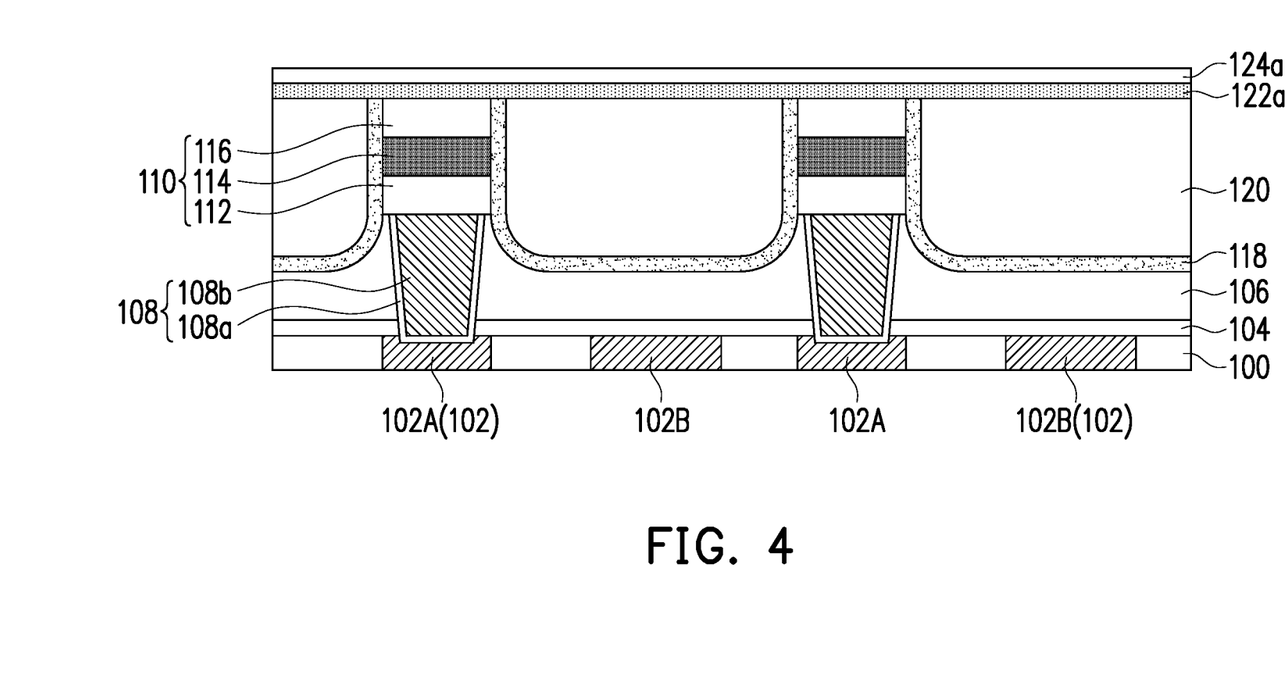

Referring to FIG. 4, an SOT material layer 122a and an etch stop material layer 124a are sequentially formed on the top surface 120t of the second dielectric layer 120 and the top surface 110t of the memory stack structure 110. The SOT material layer 122a overlays the second dielectric layer 120, the memory stack structure 110, and the protective layer 118, while the etch stop material layer 124a is formed on the SOT material layer 122a. In one embodiment, the SOT material layer 122a and the first SOT layer 114 have different materials. For example, the material of the first SOT layer 114 is tungsten (W), and the material of the SOT material layer 122a is titanium nitride (TiN). In one embodiment, a material of the etch stop material layer 124a is, for example, silicon nitride (SiN), and a thickness of the etch stop material layer 124a is between 100 Å and 500 Å. In addition, the SOT material layer 122a and the etch stop material layer 124a may be formed by a CVD method, for example.

Figure 5:
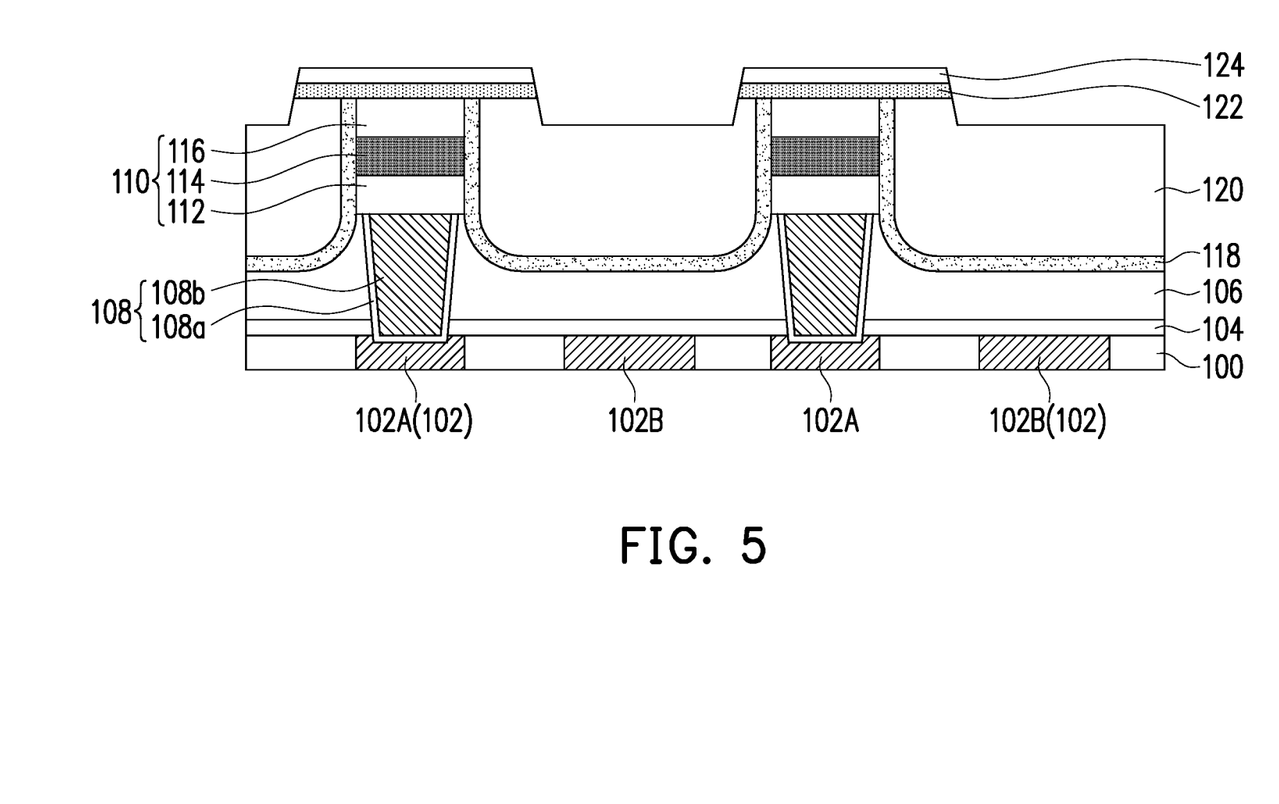

Referring to FIG. 4 and FIG. 5, the etch stop material layer 124a and the SOT material layer 122a are patterned to form a second SOT layer 122 and a etch stop layer 124 corresponding to the memory stack structure 110. Specifically, a mask pattern (e.g., a photoresist pattern) may be formed on the etch stop material layer 124a. Next, an etching process is performed by using the said mask pattern as an etching mask to remove a portion of the etch stop material layer 124a and a portion of the SOT material layer 122a, thereby forming the second SOT layer 122 and the etch stop layer 124. After the patterning process, the second SOT layer 122 and the etch stop layer 124 may be located directly on the memory stack structure 110. In one embodiment, the etching process includes a dry etching process, such as a reactive ion etching (RIE) process. In addition, the said etching process also removes a portion of the second dielectric layer 120 to ensure that adjacent second SOT layers 122 are disconnected. In this case, a top surface of the second dielectric layer 120 may be lower than a bottom surface of the second SOT layer 122 to form a groove, as shown in FIG. 5. It should be noted that an area of the second SOT layer 122 may be larger than an area of the first SOT layer 114 or an area of the memory stack structure 110. That is, the second SOT layer 122 overlays the top surface of the memory stack structure 110 and extends to cover the protective layer 118 and a portion of the top surface of the second dielectric layer 120.

Figure 6:
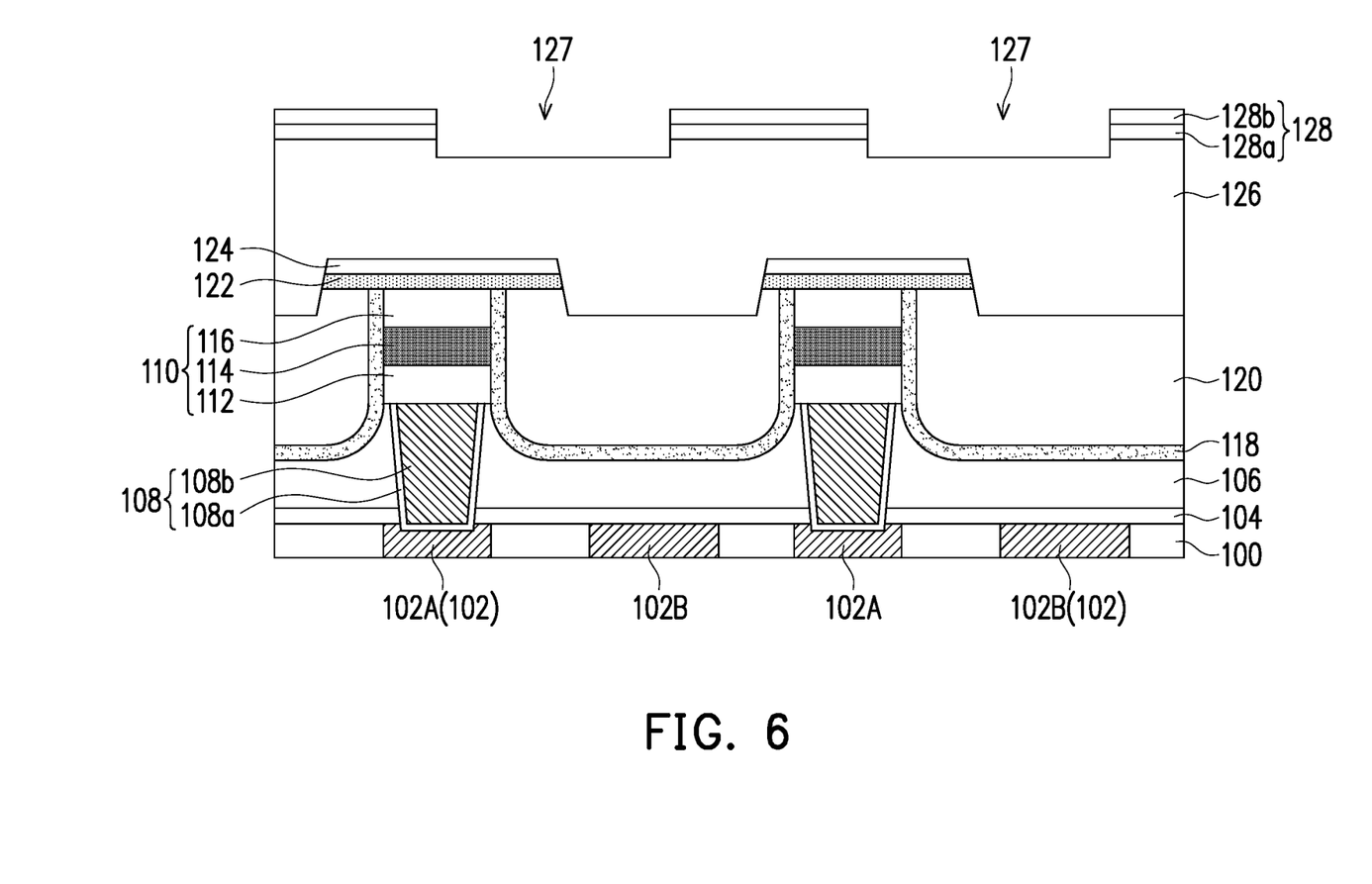

Referring to FIG. 5 to FIG. 7, a third dielectric layer 126 is formed on the etch stop layer 124 and the second dielectric layer 120. In one embodiment, a material of the third dielectric layer 126 is, for example, an ultra low-k (hereinafter referred to as ULK) dielectric material, that is, a dielectric material with a dielectric constant value less than 2.6. The formation method of the third dielectric layer 126 includes depositing the ULK dielectric material by CVD and performing a planarization process (e.g., a CMP process) on the ULK dielectric material. The third dielectric layer 126 and the underlying second dielectric layer 120 may be regarded as an interlayer dielectric (ILD) layer. The ILD layer may be disposed on the protective layer 118 and laterally surround the memory stack structure 110, the second SOT layer 122, the etch stop layer 124, and an upper metal line layer 134 and a conductive via 132 formed subsequently (as shown in FIG. 7).

Next, the upper metal line layer 134 is formed in the third dielectric layer 126. Specifically, the method of manufacturing the upper metal line layer 134 may include the following steps, but the present invention is not limited thereto. First, a hard mask layer 128 is formed on the third dielectric layer 126, as shown in FIG. 6. The hard mask layer 128 may have an opening 127 partially overlapped with the second SOT layer 122. The hard mask layer 128 may include a lower hard mask layer 128a and an upper hard mask layer 128b disposed on the lower hard mask layer 128a. In one embodiment, a material of the lower hard mask layer 128a is, for example, TiN, and a material of the upper hard mask layer 128b is, for example, silicon oxide. Afterward, using the hard mask layer 128 as a mask, an etching process (e.g., RIE process) is performed to remove a portion of the third dielectric layer 126 to form a trench in the third dielectric layer 126, wherein the trench stops on the etch stop layer 124. Then, an over-etching process is performed to remove a portion of the etch stop layer 124, so that the trench 133 extends downward and stops on the second SOT layer 122, as shown in FIG. 7. It should be noted that the material of the etch stop layer 124 is silicon nitride and the material of the third dielectric layer 126 is the ULK dielectric material, so the etch stop layer 124 and the third dielectric layer 126 have a high etching selectivity. That is to say, in the said etching process, an etching rate of the third dielectric layer 126 is greater than an etching rate of the etch stop layer 124. In this case, the trench will stop on the etch stop layer 124 without damaging the underlying second SOT layer 122. As such, the etch stop layer 124 of the present embodiment can protect the second SOT layer 122 from damage, thereby improving the process yield and the device reliability.

After forming the trench 133, the said manufacturing method further includes forming a via hole 131. The via hole 131 extends from the bottom surface of the trench 133 not blocked by the etch stop layer 124 to pass through the second dielectric layer 120, the protective layer 118, the first dielectric layer 106, and the cap layer 104, thereby reaching the second lower metal line layer 102B. The said steps of forming the trench 133 before the via hole 131 may be referred to as a trench first process. However, the present invention is not limited thereto. In other embodiments, the via hole 131 may also be formed before the trench 133, i.e., a via first process. The trench 133 may be spatially communicate with the via hole 131 to form a dual damascene opening. Afterward, the trench 133 and the via hole 131 are filled with a metal material simultaneously to form a dual damascene metal structure 130, thereby accomplishing a MRAM device of the present invention. In one embodiment, the metal material is copper, for example, and may be formed by a physical vapor deposition (PVD) method or an electroplating method. In the present embodiment, the dual damascene metal structure 130 may include a conductive via 132 and an upper metal line layer 134 disposed on the conductive via 132.

As shown in FIG. 7, the MRAM device of the present embodiment includes: the bottom electrode 108 disposed on the lower metal line layer 102; the memory stack structure 110 disposed on the bottom electrode 108; the second SOT layer 122 disposed on the memory stack structure 110; the etch stop layer 124 disposed on the second SOT layer 122; and the upper metal line layer 134 penetrating though the etch stop layer 124 and landed on the second SOT layer 122.

In one embodiment, the memory stack structure 110 may be embedded in a back-end-of-line (BEOL) structure and vertically sandwiched between the lower metal line layer 102 (e.g., metal two (M2)) and the upper metal line layer 134 (e.g., metal three (M3)). It should be noted that the upper metal line layer 134 may be directly landed on the second SOT layer 122 to increase the contact area between the upper metal line 134 and the second SOT layer 122, thereby increasing the driving current. In addition, compared with the conventional structure in which the conductive via is landed on the second SOT layer, the present embodiment can also effectively shorten the electrical path between the second SOT layer 122 and the transistors in the FEOL structure by landing the upper metal line layer 134 directly on the second SOT layer 122, so as to reduce the manufacturing cost and the interconnection resistance, thereby improving the device performance. For example, the second SOT layer 122 may be electrically connected to the underlying second transistor through an electrical path formed by the upper metal line 134, the conductive via 132, and the second lower metal line layer 102B without additional wiring.

Further, the MRAM device of the present embodiment may be, for example, a three-terminal memory device. Specifically, the memory stack structure 110 may be electrically connected to the first transistor through the bottom electrode 108 and the first lower metal line layer 102A. One end of the second SOT layer 122 may be electrically connected to the second transistor different from the first transistor through the electrical path formed by the upper metal line 134, the conductive via 132, and the second lower metal line layer 102B. The other end of the second SOT layer 122 (i.e., the end perpendicular to the paper surface, not shown in this cross section) may be grounded through another electrical path.

In summary, in the embodiment of the present invention, a thin silicon nitride layer is used as the etch stop layer and formed on the second SOT layer to prevent from damaging the second SOT layer due to the formation of trenches or vias in the subsequent BEOL process, thereby improving the process yield and the device reliability. In this case, the upper metal line may be directly landed on the second SOT layer to increase the contact area between the upper metal line and the second SOT layer, thereby increasing the driving current. In addition, the structure of the upper metal line directly landed on the second SOT layer can also effectively shorten the electrical path between the second SOT layer and the transistors in the FEOL structure, so as to reduce the manufacturing cost and the interconnection resistance, thereby improving the device performance.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A magnetoresistive random access memory (MRAM) device, comprising:
 a magnetic tunnel junction (MTJ) structure disposed on a bottom electrode;
 a first spin orbit torque (SOT) layer disposed on the MTJ structure;
 a cap layer disposed on the first SOT layer;
 a second SOT layer disposed on the cap layer;
 an etch stop layer disposed on the second SOT layer;

an upper metal line layer penetrating though the etch stop layer and landed on the second SOT layer;
a protective layer covering a sidewall of the MTJ structure, a sidewall of the first SOT layer, and a sidewall of the cap layer;
an interlayer dielectric (ILD) layer disposed on the protective layer and laterally surrounding the MTJ structure, the first SOT layer, the cap layer, the second SOT layer, the etch stop layer, and the upper metal line layer;
a first lower metal line layer disposed directly under the bottom electrode, wherein the bottom electrode is electrically connected to a first transistor through the first lower metal line layer; and
a second lower metal line layer disposed aside the first lower metal line layer, wherein the upper metal line layer is electrically connected to the second lower metal line layer through a conductive via penetrating through the ILD layer and the protective layer, and the second lower metal line layer is electrically connected to a second transistor different from the first transistor.

2. The MRAM device of claim 1, wherein a material of the etch stop layer comprises SiN, and a thickness of the etch stop layer is between 100 Å and 500 Å.

3. The MRAM device of claim 1, wherein a material of the cap layer comprises Ta, TaN, Pt, WN, or a combination thereof.

4. The MRAM device of claim 1, wherein a material of the first SOT layer comprises W, and a material of the second SOT layer comprises TiN.

5. The MRAM device of claim 1, wherein a material of the protective layer comprises SiN.

6. The MRAM device of claim 1, wherein an area of the second SOT layer is greater than an area of the first SOT layer.

7. A method of forming a magnetoresistive random access memory (MRAM) device comprising:
forming a bottom electrode in a first dielectric layer;
forming a memory stack structure on the bottom electrode;
forming a protective layer to conformally cover a top surface and a sidewall of the memory stack structure;
forming a second dielectric layer on the protective layer;
performing a planarization process to expose the top surface of the memory stack structure;
sequentially forming a SOT material layer and an etch stop material layer on the second dielectric layer and the top surface of the memory stack structure;
patterning the etch stop material layer and the SOT material layer to form a second SOT layer and an etch stop layer corresponding to the memory stack structure;
forming a third dielectric layer on the etch stop layer and the second dielectric layer;
forming an upper metal line layer in the third dielectric layer and forming a conductive via in the first dielectric layer, the second dielectric layer and the protection layer, wherein the upper metal line layer penetrates through the etch stop layer and stops on the second SOT layer; and
forming a first lower metal line layer disposed directly under the bottom electrode, wherein the bottom electrode is electrically connected to a first transistor through the first lower metal line layer; and
forming a second lower metal line layer disposed aside the first lower metal line layer, wherein the upper metal line layer is electrically connected to the second lower metal line layer through the conductive via penetrating through the second dielectric layer, the first dielectric layer and the protective layer, and the second lower metal line layer is electrically connected to a second transistor different from the first transistor.

8. The method of forming the MRAM device of claim 7, wherein the memory stack structure comprises, from bottom to top, an MTJ structure, a first SOT layer, and a cap layer.

9. The method of forming the MRAM device of claim 8, wherein the first SOT layer and the second SOT layer have different materials, a material of the first SOT layer comprises W, and a material of the second SOT layer comprises TiN.

10. The method of forming the MRAM device of claim 7, wherein a material of the etch stop layer comprises SiN, and a thickness of the etch stop layer is between 100 Å and 500 Å.

11. The method of forming the MRAM device of claim 7, wherein after forming the second dielectric layer, a topmost surface of the second dielectric layer on the memory stack structure is higher than a topmost surface of the second dielectric layer aside the memory stack structure.

12. The method of forming the MRAM device of claim 7, wherein after performing the planarization process, the top surface of the memory stack structure is substantially level with a top surface of the second dielectric layer.

13. The method of forming the MRAM device of claim 7, wherein after the patterning of the etch stop material layer and the SOT material layer, the second SOT layer and the etch stop layer are located directly above the memory stack structure, and a portion of the second dielectric layer is removed so that a top surface of the second dielectric layer is lower than a bottom surface of the second SOT layer.

14. The method of forming the MRAM device of claim 7, wherein after the patterning of the etch stop material layer and the SOT material layer, the second SOT layer further extends to cover a top surface of the second dielectric layer.

15. The method of forming the MRAM device of claim 7, wherein the forming the upper metal line layer comprises:
forming a hard mask layer on the third dielectric layer, wherein the hard mask layer has an opening partially overlapped with the second SOT layer;
removing a portion of the third dielectric layer by using the hard mask layer as a mask to form a trench in the third dielectric layer, wherein the trench stops on the etch stop layer;
performing an over-etching process to remove a portion of the etch stop layer so that the trench extends downward and stops on the second SOT layer; and
filling the trenches with a metal material.

16. The method of forming the MRAM device of claim 15, wherein after the forming the trench, the method further comprises forming a via hole, wherein the via hole extends from the bottom surface of the trench through the second dielectric layer, the protective layer, and the first dielectric layer to reach a lower metal line layer.

17. The method of forming the MRAM device of claim 15, wherein before the forming the trench, the method further comprises forming a via hole in the first dielectric layer and the second dielectric layer beside the memory stack structure, wherein the trench is formed on the via hole to spatially communicate with the via hole.

18. The method of forming the MRAM device of claim 17, wherein the metal material is simultaneously filled into the trench and the via hole to form the upper metal line layer and the conductive via.

* * * * *